F. O. KLOCK.
DIRECTION INDICATOR FOR AUTOMOBILES.
APPLICATION FILED JAN. 25, 1915.
1,186,407.
Patented June 6, 1916.
3 SHEETS—SHEET 3.
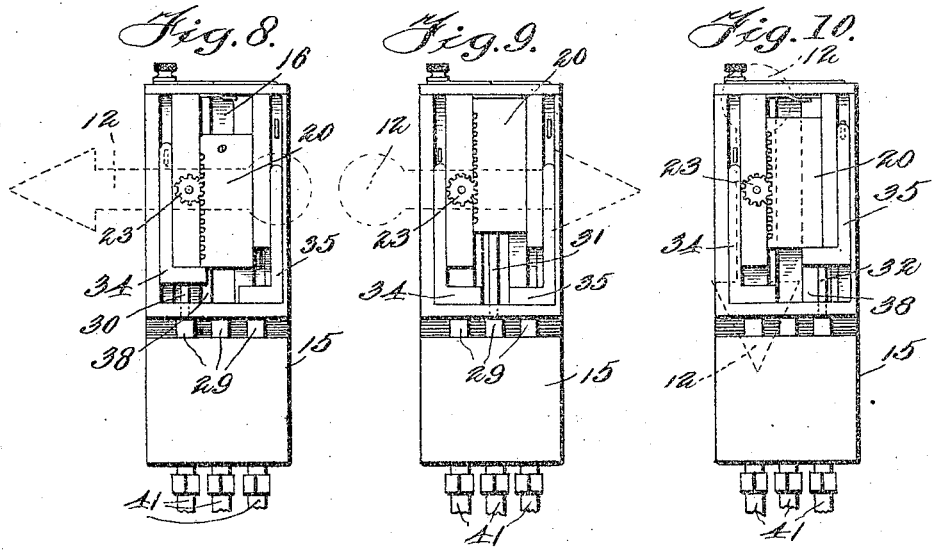
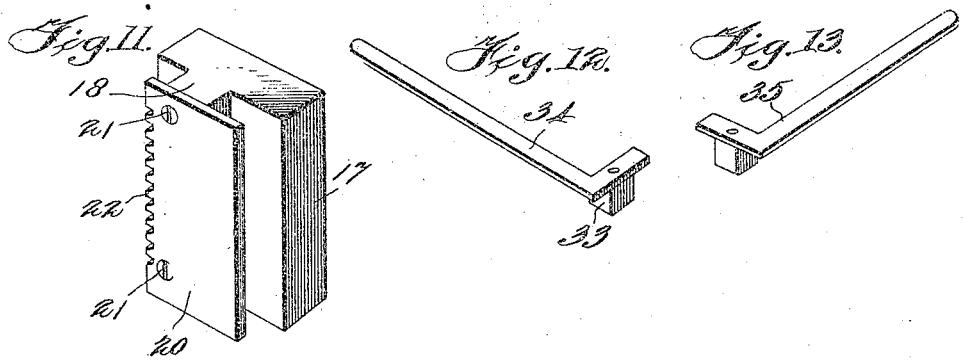
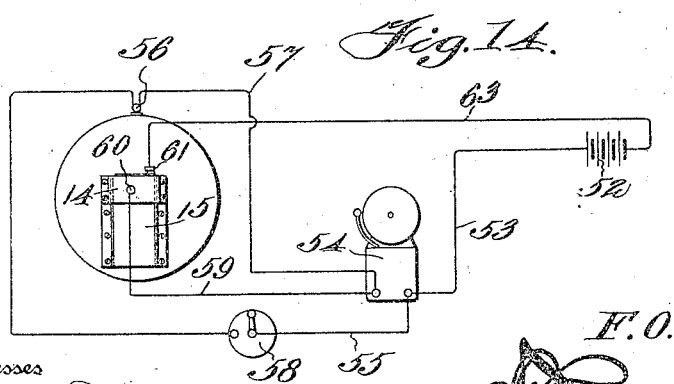
Witnesses
Inventor
F. O. Klock,
By
Attorney

UNITED STATES PATENT OFFICE.

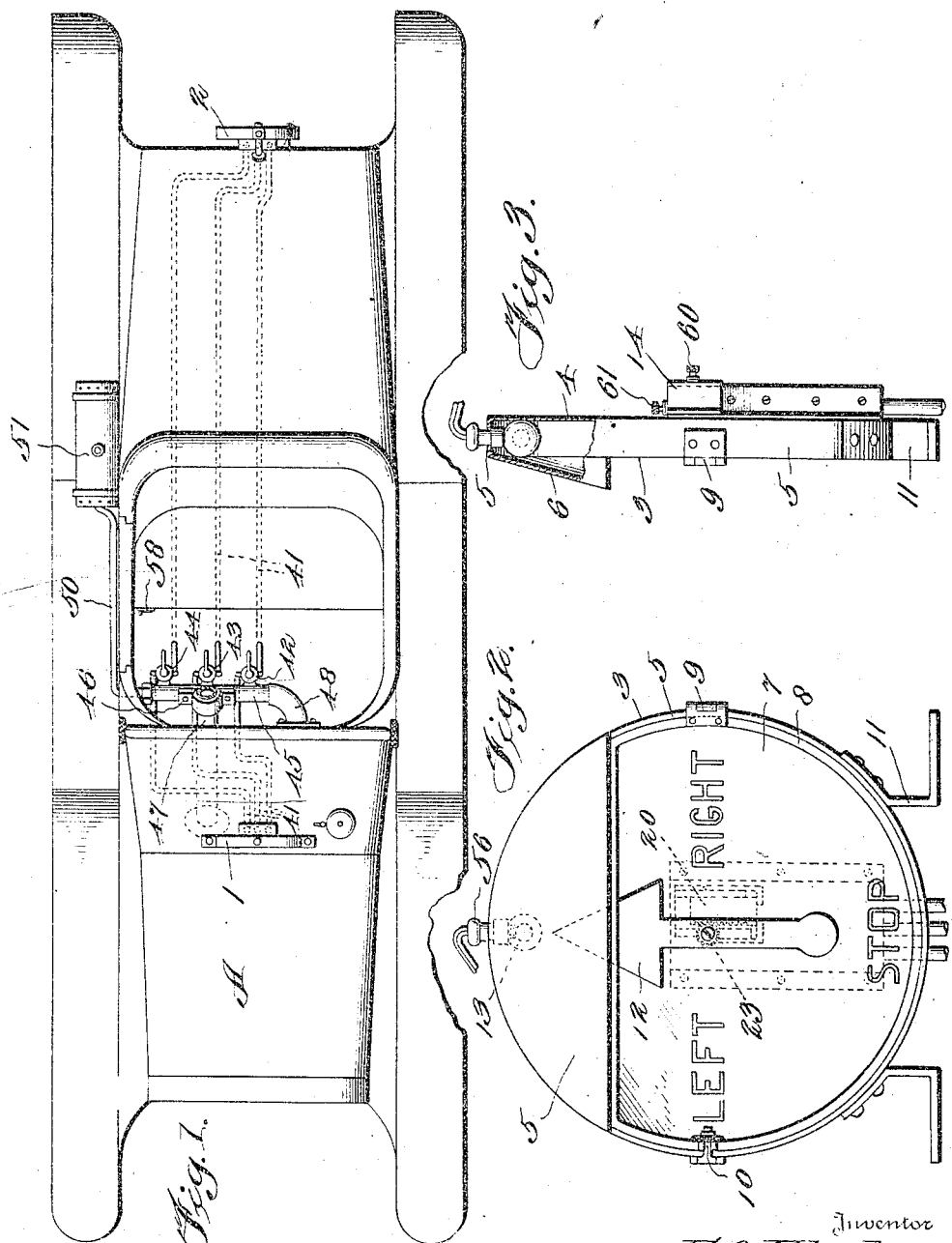

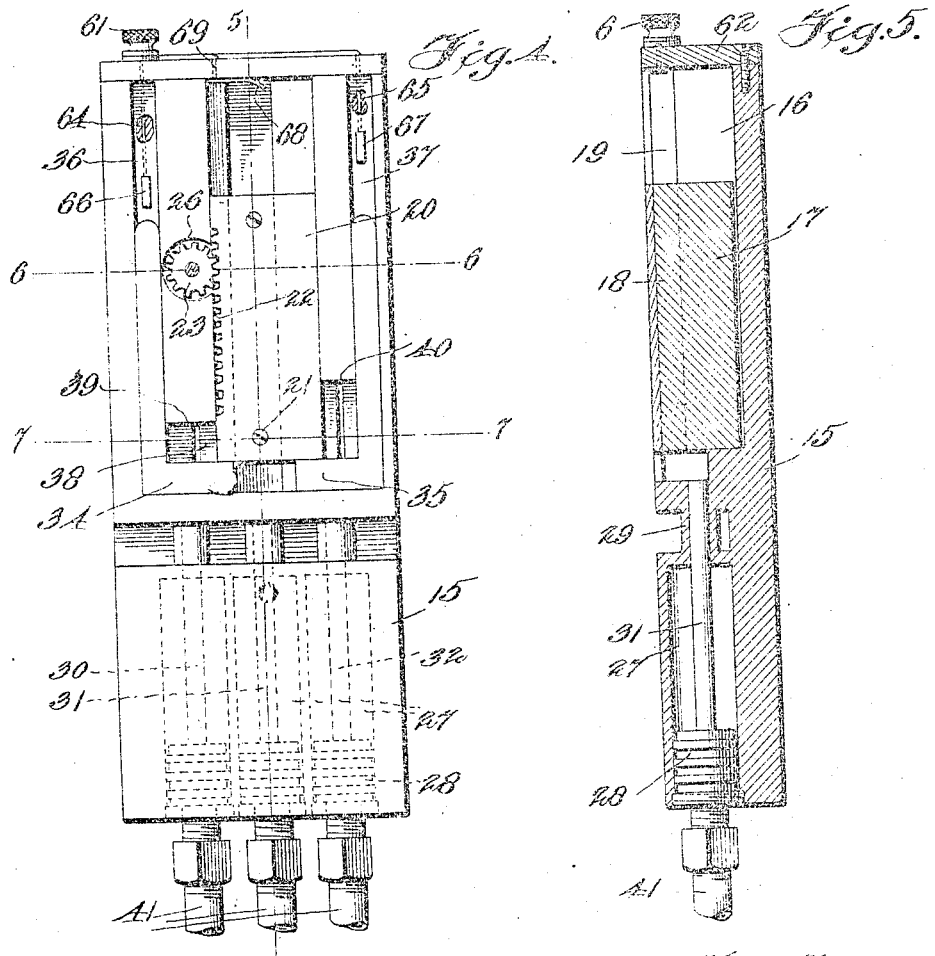

FRED O. KLOCK, OF BUFFALO, NEW YORK.

DIRECTION-INDICATOR FOR AUTOMOBILES.

1,186,407.  Specification of Letters Patent.  Patented June 6, 1916.

Application filed January 25, 1915. Serial No. 4,288.

*To all whom it may concern:*

Be it known that I, FRED O. KLOCK, a citizen of the United States, residing at Buffalo, in the county of Erie and State of New York, have invented certain new and useful Improvements in Direction-Indicators for Automobiles; and I do hereby declare the following to be a full, clear, and exact description of the invention, such as will enable others skilled in the art to which it appertains to make and use the same.

This invention relates to direction indicators for motor vehicles and resides in the provision of simple and effective means for indicating the direction the vehicle is to pursue or that the vehicle is to stop; the means being arranged so that it may be operated from the driver's seat and constructed in such manner that it may be readily seen at all times from a considerable distance in the rear or in the front of the vehicle.

An object of importance is to provide audible signaling means which will operate as long as the direction indicating means is in operation, thus notifying the driver of the vehicle that the device is operating properly.

Another and more specific object is to provide a pivoted indicating arrow which is controlled and operated by simple and reliable means that is attached to the automobile so as to take up little space and can be accurately and easily operated from the driver's seat.

Another object of importance is to improve direction indicating devices of the character described so as to render them more practical, simple as to construction and effective without materially increasing the cost of manufacture thereof.

The above and additional objects are accomplished by such means as are illustrated in the accompanying drawings, described in the following specification and then more particularly pointed out in the claims.

With reference to the drawings, wherein I have illustrated the preferred embodiment of my invention as it is reduced to practice, and throughout the several views of which similar reference numerals designate corresponding parts, Figure 1 is a plan view of an automobile equipped with my improved direction indicating device, showing the steering column of the automobile in section and the controlling or operating means of the device attached thereto, Fig. 2 is a detail front elevation of the indicator, Fig. 3 is a side elevation of the indicator showing it broken away adjacent to the upper end thereof and in section, Fig. 4 is a detail front elevation of the operating means, Fig. 5 is a vertical sectional view taken on line 5—5 of Fig. 4, Fig. 6 is a horizontal sectional view taken on line 6—6 of Fig. 4, Fig. 7 is a horizontal sectional view taken on line 7—7 of Fig. 4, Fig. 8 is a detail front elevation of the operating means showing the arrow in signaling position to indicate that the vehicle is to turn to the left, and Fig. 9 is a front elevation of the operating means showing it in position assumed when the arrow points to the right, Fig. 10 is a detail front elevation of the operating means showing the arrow pointing downwardly and the means in position when the arrow indicates that the vehicle is to stop, Fig. 11 is an enlarged detail perspective view of a part of the operating mechanism, Fig. 12 is an enlarged detail perspective view of one of the operating elements of the operating device, Fig. 13 is a detail perspective view of the other of the operating elements corresponding to the one illustrated in Fig. 12, and Fig. 14 is a diagrammatic view of the electrical circuit employed in connection with the device.

Referring to the drawings by characters of reference, A designates an automobile and 1 and 2 indicating devices arranged at the front and rear of the automobile. The indicating devices are similar as to construction and each consists of a substantially cylindrical casing 3 which comprises a circular sheet metal disk 4 which is formed with a peripheral right angularly extending flange 5 and serves as the back wall for the casing. From the top of the casing 3 is extended a hood 6 which is carried by the flange 5 and covers the front of the casing at the upper side thereof. This hood 6 is directed downwardly and outwardly so as to readily shed water and is arranged for coöperation with a transparent front wall 7, preferably glass. The front wall 7 is mounted in a frame 8 and the frame is hinged as at 9 to the flange 5. Suitable locking or latching means designated 10 as an entirety is provided and comprises elements carried by the frame 8 and flange 5 at points opposite to the hinge 9. Secured to the flange 5 and depending therefrom are brackets 11 which provide means for attaching the casing to the automobile.

The wall 7 extends upwardly sufficiently to coöperate with the hood 6 in protecting the mechanism contained within the casing against the elements. The disk 4 forming the back wall of the casing is painted a bright color, for example, red, in order that the device may be plainly seen.

Rotatably mounted within the center of the casing is an indicating arrow 12 which is normally pointed upward and preferably painted white or some other light color which may be plainly seen on the darker background provided by the back wall 5. An electric lamp 13 is mounted within the casing 3 between the hood 6 and disk 4 to illuminate the indicating arrow. The inner face of the hood 6 is constructed to act as a reflector.

A clamp 14 is hingedly secured upon the back of the disk 4 centrally thereof and removably secures a casting 15 upon the back of the disk. The casting 15 is substantially rectangular and supports the operating mechanism for the indicating arrow. The upper portion of the casting 15 is formed in one face thereof with a longitudinal weight receiving recess 16 in which is vertically and slidably mounted a substantially rectangular weight 17. The weight 17 is formed on its outer face with a longitudinally extending flange or rib 18. The rib 18 engages in the reduced portion 19 of the recess 16 and has secured upon its outer face a relatively thin operating plate 20. Screws 21 are inserted through the plate 20 and into the rib or flange 18. The plate 20 slidably engages the walls of the recess 16 and terminates approximately flush with the recessed face of the casting. Formed on one longitudinal edge of the plate 20 are a plurality of gear teeth 22 which are arranged to mesh with a pinion 23 that is carried by the arrow 12. The arrow 12 is provided intermediate its ends and upon its inner face with an opening 24 through which is inserted a screw 25. The pinion 23 is fixed to the rear face of the shaft of the arrow 12, has an opening therethrough which alines with the opening 24, and projects through an opening formed in the center of the disk 4. A circular recess 26 is formed in the casting 15 at a point intermediate the ends of the recess 16 in said casting and receives the pinion 23. A screw 25 is inserted through the pinion 23 and turned in an opening formed in the casting 15 as shown clearly in Fig. 7 in the drawings thus acting as a shaft for the pinion 23. The recess 26 at one side opens in communication with the recess 16 and said pinion projects through the open side of the recess and meshes with the teeth 22 on the plate 20. It will be seen that as long as the weight member 17 is in down position as shown in Figs. 4 and 5, the arrow will point upwardly but upon upward movement of the weight member the arrow will be moved from right to left into indicating position. The lower end of the casting 15 is formed into a number of cylinders 27 which are arranged in vertical parallel relation to one another and contains pistons 28.

The recess 16 is enlarged at its lower end and is communicated with the cylinders 27 by means of cylindrical bushings 29 carried by the cylinders and the lower wall of the recess 16. Carried by the pistons 28 are piston rods 30, 31, and 32 which extend into the bushings 29 and are arranged to extend into the enlarged portion of the recess 16. The central piston rod 30 is arranged directly beneath the weight 17 and when forced upwardly into the recess 16 engages and moves the weight 17 upwardly. This upward movement of the weight 17 causes the pinion 23 to rotate and the arrow 12 to move from normal position to right hand signaling position, that is a horizontal position with its head thereof pointing to the right. The extent of the movement of the arrow 12 in this connection is regulated by the extent of the movement of the weight 20, principally the piston rod 31. The piston rods 30 and 32 on opposite sides of the piston 31 are arranged to engage lugs or projections 33 carried on similar L-shaped operating members 34 and 35. These members 34 and 35 are mounted upon the casting 15 with their vertical portions arranged to slide in longitudinal recesses 36 and 37. The recesses 36 and 37 are formed in the casting 15 on opposite sides of the recess 16 and open at their lower ends into the enlarged lower portion of the recess 16. Web portions 38 are formed between the lower wall of the recess 16 and the unenlarged portion of the recess. The horizontal portions of the L-shaped members 34 and 35 rest upon the webs 38 while the projections or lugs 33 are disposed between the webs 38 and outer walls of the recess 16. The horizontal portions of the members 34 and 35 are arranged to engage the lower edge of the plate 20, thus when the piston rods 30 and 32 are forced upwardly into the recess 16 they engage the projections or lugs 33 and move the L-shaped members 34 and 35 upwardly, causing the horizontal portions of the members 34 and 35 to engage and move upwardly the plate 20 and weight 17. The enlarged portion of the recess 16 is reduced upon the side of the casting upon which is mounted the member 34 and the shoulders 39 and 40 which are defined by the enlargement of the recess 16 engage the horizontal portions of the members 34 and 35 and limit the upward movement of said member. The shoulder 39 is disposed nearer to the lower wall of the recess 16, thus the upward movement of the piston rod 30 and member 34 is limited relative to the piston rod 32 and parts which it coöperates with. When the piston rod 30 is moved upwardly and moves the member 34 and plate 20 correspondingly, the arrow is rotated from its vertical normal position 45 degrees and points toward the left, but when the piston rod 32 is moved upwardly, the arrow is moved 90 degrees and points downwardly.

Connected with the cylinders 27 at the lower ends of said cylinders are feed pipes 41, three of these pipes being used. These pipes 41 are directed from the devices 1 and 2 at the front and rear of the vehicle to a point adjacent to the driver's seat and are connected with valves 42, 43 and 44. The valves 42, 43, and 44 are supported by a pipe 45 which is secured by means of a suitable clamp 46 to the steering column 47 of the automobile. An elbow 48 is secured to the pipe 45 and to the dash board or some other suitable point on the machine so as to support the pipe in position. The valves 42, 43, and 44 are identical as to construction and each is provided with an operating handle 49 and are furthermore communicated with the pipe 45. A pipe 50 is connected with the pipe 45 and with a source of air or other fluid supply 51. This source of air supply comprises a tank carried upon the automobile. It will be seen that when the valves 42, 43, and 44 are operated to communicate the pipe 45 with the pipe 41, the pistons 28 and the cylinders 27 will be forced upwardly. The valves are preferably of the type which provide for the exhausting of the air in the pipe when rotated to a certain point. It is not thought necessary to illustrate this common type of valve in this connection. The handles 49 have stamped thereon preferably the words "Right", "Left" and "Stop", not shown. The words "Left" and "Right" are also printed or otherwise placed upon the disk 4 on opposite sides of the arrow 12 and the word "Stop" at the lower edge of the disk 4 beneath the arrow 12.

In operation, should it be desired to indicate to other vehicles that a right turn is to be made, the valve 43 is opened to allow for the communication of the pipes 45 and 41. The piston 28 in the middle cylinder 27 is forced upwardly causing the piston rod 31 to engage and move upwardly the weight 17. As the weight 17 moves upwardly, the teeth 22 on the plate 20 mesh with the pinion 23 carried by the arrow and the arrow is rotated 135 degrees relative to its normal position and points to the right. When the air is released from the cylinder which is mounted in the piston rod 31, the weight 17 will drop into normal position and the arrow will be moved into original position. The other movement of the arrow may be had by operating the valves 42 and 44 and when the pistons 28 in the outer cylinders move upwardly, the members 34 and 35 move the plate 20 and weight 17 upwardly as previously described. The extent of the upward movement of the piston rods 30 and 32 is regulated as previously described so that the proper movement of the arrow is insured.

Referring particularly to Fig. 14, 52 designates a battery or some other suitable source of current from one side of which leads a wire 53. This wire 53 is connected with an audible signal 54 which in this instance is an electric bell. The signal 54 is arranged at any suitable point upon the automobile and is to be operated while the direction indicator is operated. A conductor 55 leads from the bell 54 to the binding post 56 on the casing 3 which is in communication with the electric lamp 13 in the casing. From the binding post 53 a conductor 57 extends and is connected with the other binding post on the electric bell 54. A one pole switch 58 is connected with the conductor 55 and may be located upon the dash board or some other suitably convenient place on the automobile. A conductor 59 leads from the binding post on the bell 54 to which the conductor 57 is secured to a binding post 60 on the clamp 14, which secures the casting 15, thus grounding the casting and metal parts carried thereby in the circuit. From a binding post 61 which is carried upon a detachable cover plate 62 which closes the upper end of the casting 15, a conductor 63 leads and is connected with the other side of the battery or source of current 62. Leading from the binding post 61 are insulating conductors 64 and 65 which are connected with spring contact plates 66 and 67. The contact plates 66 and 67 are positioned within the recesses 36 and 37 in the casting 15 at points normally spaced from the upper end of the members 34 and 35 but so as to engage the members 34 and 35 upon upward movement of said members. These contact plates 66 and 67 are insulated from the casting in any suitable manner. A spring contact plate 68 is secured in the upper end of the recess 16 in position to be engaged by the plate 20 or weight 17. This contact plate 68 is insulated from the casting and connected by means of a suitable conductor 69 with the binding post 61.

Assuming that the piston rod 31 has been forced upwardly, for example, the weight 17 will engage the contact 68 and close the circuit for the electric lamps 13 and the audible signal 54. The lamps 13 remain lighted and the audible signal 54 operates as long as the signaling arrow is in signaling position. The audible signal 54 indicates to the driver of the automobile that the signaling device is operated perfectly. The members 34 and 35 close the circuit as well as the weight 17 upon operation of the piston rods 30 and 32, the vertical portions of the members 34 and 35 engaging the contact plates 66 and 67 to provide for the closing of the circuit.

With reference to the foregoing description and accompanying drawings, it will be observed that I have provided a direction indicator which is particularly designed and will prove useful in connection with motor fire engines and other motor vehicles.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as claimed.

What is claimed is:—

1. A direction indicator for automobiles comprising a casing, a rotatable indicating member mounted within the casing, reciprocal members, means to move the reciprocal members upwardly, vertically movable means to rotate the indicating member to be engaged and moved upwardly by the reciprocal members, an electrical circuit, an audible signal, contact members normally spaced from the vertically movable members and arranged to be engaged therewith upon the upward movement of the vertically movable members and an electric lamp included in said circuit, said lamp and audible signal to operate upon movement of the indicating member.

2. A direction indicator comprising a casing, a rotatable indicating member mounted in the casing, a casting including a plurality of cylinders secured to the casing, pistons slidable within the cylinders, piston rods carried by the pistons and extended out of the cylinders, a pinion fixed to said rotatable member, a rack member slidable upon the casting and in mesh with said pinion, means to be engaged by said piston rods to move said rack member relative to the pinion and means to vary the extent of movement of said rack member whereby the indicating member is moved into different positions.

3. A direction indicator comprising a casing, a rotatable indicating member mounted in the casing, a casting including a plurality of cylinders secured to the casing, pistons slidable within the cylinders, piston rods carried by the pistons and extended out of the cylinders, a pinion fixed to said rotatable member, a rack member slidable upon the casting and in mesh with said pinion, means to be engaged by said piston rods to move said rack member relative to the pinion, means to vary the extent of movement of said rack member whereby the indicating member is moved into different positions, and means to automatically return the indicating member to normal position.

4. A direction indicator comprising a casing, a rotatable indicating member mounted in said casing, a casting including a plurality of cylinders secured to said casing, pistons mounted within the cylinders, piston rods carried by the pistons and extended out of the cylinders, a pinion fixed to said rotatable indicating member, a rack member slidably mounted upon said casing and engaging said pinion and means to be engaged by said piston rods to move said rack member and said pinion, which means moves the rack member relative to the pinion and means to vary the extent of the movement of the rack member.

5. A direction indicator comprising a rotatable indicating arrow, a support, a bearing member inserted through the arrow and secured to the support, a pinion fixed to the arrow and surrounding the bearing member, a rack member slidable upon the support and meshing with the pinion, a weight member slidable upon the support and secured to the rack member, said rack member arranged to move in a vertical path, a plurality of cylinders carried by the support, pistons slidable within the cylinders, piston rods carried by the pistons and extended through the cylinders, one of said piston rods being arranged to engage said weight, a source of air supply, pipes communicating the source of air supply with the pistons in the cylinders, valves mounted in said pipes and slidable members interposed between the rack member and the other of the piston rods and being of variable movable extent.

In testimony whereof I affix my signature in presence of two witnesses.

FRED O. KLOCK.

Witnesses:
August Schwegler,
James Dorothy.